United States Patent
Böhler

(10) Patent No.: US 6,494,533 B1
(45) Date of Patent: Dec. 17, 2002

(54) MOTOR VEHICLE SEAT WITH A TRAY

(75) Inventor: Stefan Böhler, Stadthagen (DE)

(73) Assignee: Faurecia Autositze GmbH & Co. KG, Stadthagen (DE)

(*) Notice: Subject to any disclaimer, the term of this patent is extended or adjusted under 35 U.S.C. 154(b) by 0 days.

(21) Appl. No.: 09/668,139

(22) Filed: Sep. 25, 2000

(30) Foreign Application Priority Data

Sep. 23, 1999 (DE) .......................... 199 45 554

(51) Int. Cl.⁷ .................................. A47C 7/62
(52) U.S. Cl. ............ 297/188.05; 297/146; 297/188.04; 297/188.07
(58) Field of Search ................. 297/146, 188.04, 297/188.05, 188.07

(56) References Cited

U.S. PATENT DOCUMENTS

| | | | | |
|---|---|---|---|---|
| 216,676 A | * | 6/1879 | Hill | 297/169 |
| 333,853 A | * | 1/1886 | Handy | 297/146 |
| 1,034,678 A | * | 8/1912 | Berger et al. | 297/112 |
| 1,143,831 A | * | 6/1915 | Kawasaki | 297/146 |
| 3,615,118 A | * | 10/1971 | Buxton | 297/188.07 |
| 3,773,381 A | * | 11/1973 | Brennan | 297/167 |
| 3,795,422 A | * | 3/1974 | Robinson et al. | 297/146 |
| 4,159,071 A | * | 6/1979 | Roca | 297/163 |
| 4,726,621 A | * | 2/1988 | Müller | 297/146 |
| 4,836,602 A | * | 6/1989 | d'Almada Remedios et al. | 297/188.06 |
| 5,092,652 A | * | 3/1992 | Macaluso | 297/146 |
| 5,984,347 A | * | 11/1999 | Blanc-Rosset | 280/727 |

FOREIGN PATENT DOCUMENTS

| | | | |
|---|---|---|---|
| DE | 3942629 A1 | * | 6/1991 |
| EP | 0 528 142 A1 | | 6/1992 |

* cited by examiner

Primary Examiner—Peter M. Cuomo
Assistant Examiner—Joseph Edell
(74) Attorney, Agent, or Firm—Connolly Bove Lodge & Hutz LLP

(57) ABSTRACT

On a motor vehicle seat, a tray on back of the backrest may be pivoted around a horizontal transverse axis that is fixed to the rest from a contact position in which it lies against the back, into a horizontal position. An additional tray is likewise articulated on the back, with a horizontal transverse axis that is firmly attached to the rest, and it, too, may be pivoted from a position of contact into a horizontal position. The transverse axes run adjacent to various longitudinal edges of the various trays.

10 Claims, 6 Drawing Sheets

MOTOR VEHICLE SEAT WITH A TRAY

FIELD OF THE INVENTION

The invention pertains to a motor vehicle seat with a tray that may be pivoted on the back of a backrest.

BACKGROUND OF THE INVENTION

A motor vehicle seat of the type that may be presumed to be known (EP 05 28 142 A1) exhibits a single collapsible tray on the back of its backrest, which pivots around a horizontal transverse axis. This tray cannot be embodied in any arbitrary size. Even in instances of generous spatial dimensions in the motor vehicle, the tray cannot be embodied so as to be arbitrarily large because the burden imposed upon its bearing point: by the long arms, effective arms of a lever, would require a reinforced structure of the rest, and attachment elements that were rendered rigid.

SUMMARY OF THE INVENTION

Taking this state of the art as a point of departure, it is the underlying task of the invention, in the case of the motor vehicle seat which may be presumed to be known, to increase the usable surface area of the tray without having to accept great loads upon the bearing points as a part of the bargain.

The resolution of this task is accomplished by the characteristics described herein.

The sub-division of the tray's surfaces on several planes, each with its own points of articulation on the backrest, permits an enlargement of the tray's usable surfaces when compared with a single-piece embodiment, without necessitating an increase of the stresses imposed upon the load-bearing points and upon the tray itself. Such a tray can thus be constructed in a manner that is relatively sparing of weight and that, in addition, requires no reinforcement of the structure of the backrest.

In a particularly preferred embodiments of the invention, the concentration of the holding depressions on one tray renders it possible to configure the other tray so as to be completely flat so that it lends itself particularly well as a rest for paper, while it is being written upon, without disturbing edges. As a result of the positioning of the upper tray on support rods that bridge any free space between the back of the backrest and the longitudinal edge of the tray, which is turned toward it, objects, even if they protrude upward to a great degree, can be placed upon the lower tray.

In what follows, two preferred embodiments of the invention are described in detail and by virtue of the drawings

DETAILED DESCRIPTION OF THE INVENTION

Figure 1:
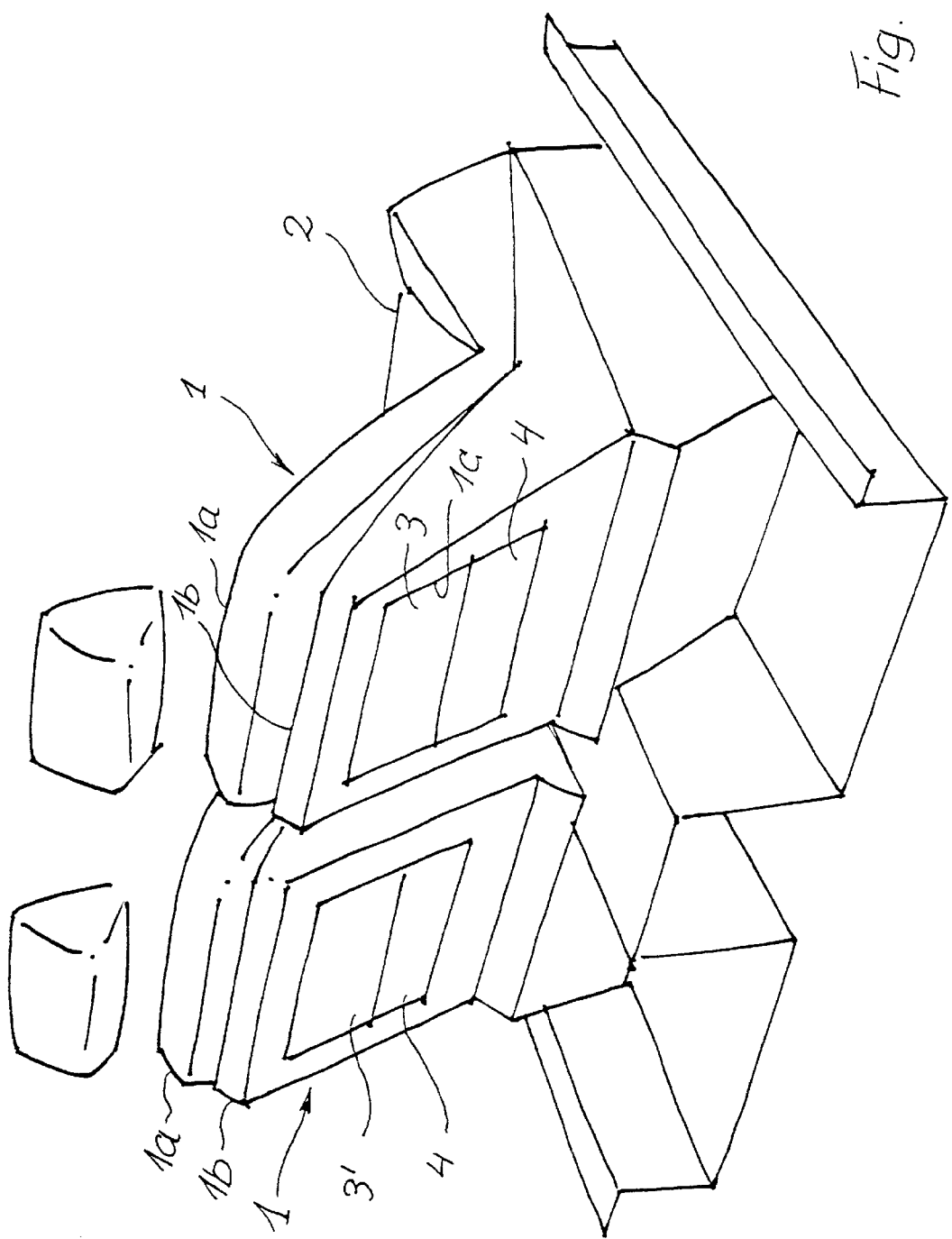
FIG. 1 shows a schematic view, in perspective, of two front seats of a motor vehicle, obliquely from the rear.

In the drawings, identical parts are given identical reference symbols, which can be distinguished from each other, if necessary, by means of prime marks.

In FIG. 1, two motor vehicle seats that are arranged next to each other in a row are depicted, each of which exhibits a backrest 1 and a seat portion 2. Backrest 1 comprises a rest cushion 1a and a rest covering 1b. In backrest 1, a recess 1c is provided, in which two trays, 3 and 4 or 3', 4, respectively, are stored so as to be flush with the rest cover 1b.

Figure 2:
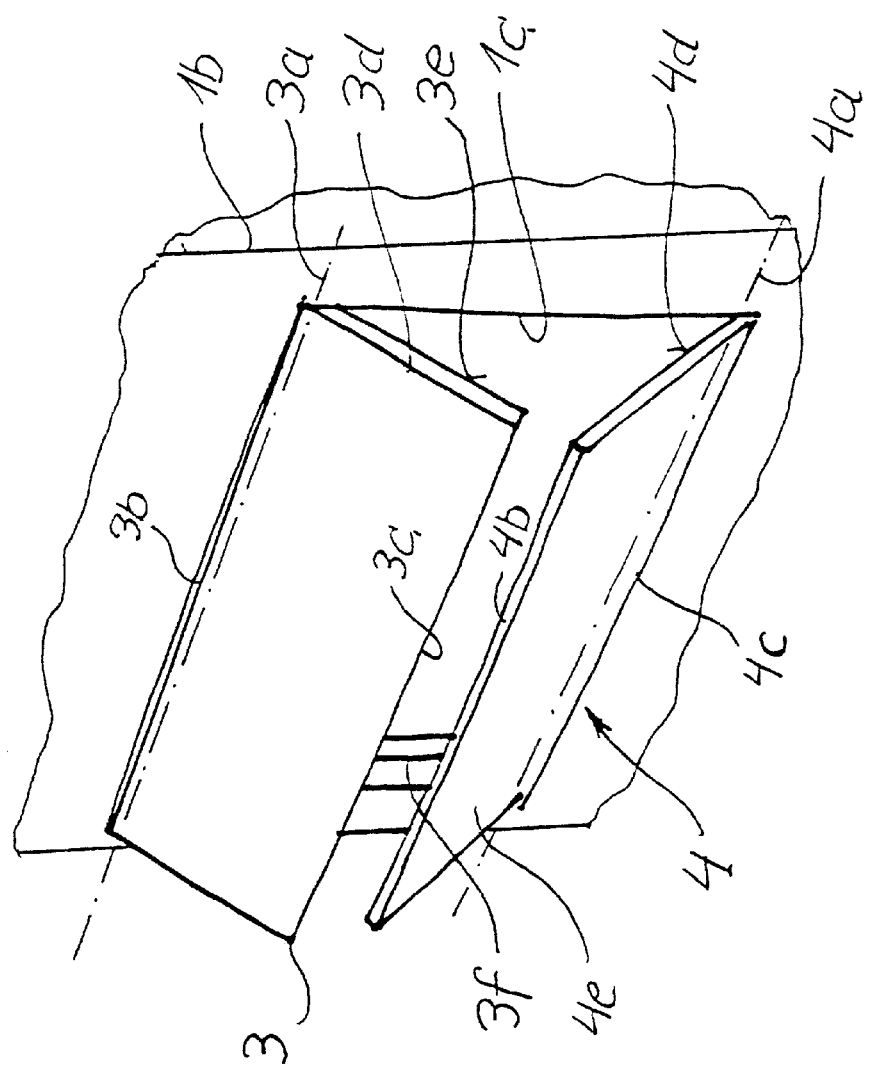
FIG. 2 shows a perspective cut-out of the backrest of one of the front seats, according to FIG. 1, with trays that are folded halfway open in a first embodiment form.

In FIG. 2, trays 3 and 4, which are folded out into the partially opened position, are depicted more closely. Tray 3 folds upward around a horizontal transverse axis 3a, which is adjacent to an upper longitudinal edge, 3b. The side of the tray 3 that faces the outside when it is in the folded up state becomes the flat top 3d; the side that lies toward the interior becomes the underside 3e. The lower tray 4 folds downward around a transverse axis 4a, which is adjacent to a lower longitudinal edge 4c of tray 4 that is parallel to the first transverse axis 3a. By these means, the side of tray 4 that faces backrest 1 in the folded-up state becomes the top 4d, and the side that lies opposite it becomes the underside, 4e. In the folded-up state, trays 3 and 4 abut one another with their longitudinal edges 3c and 4b.

Figure 3:
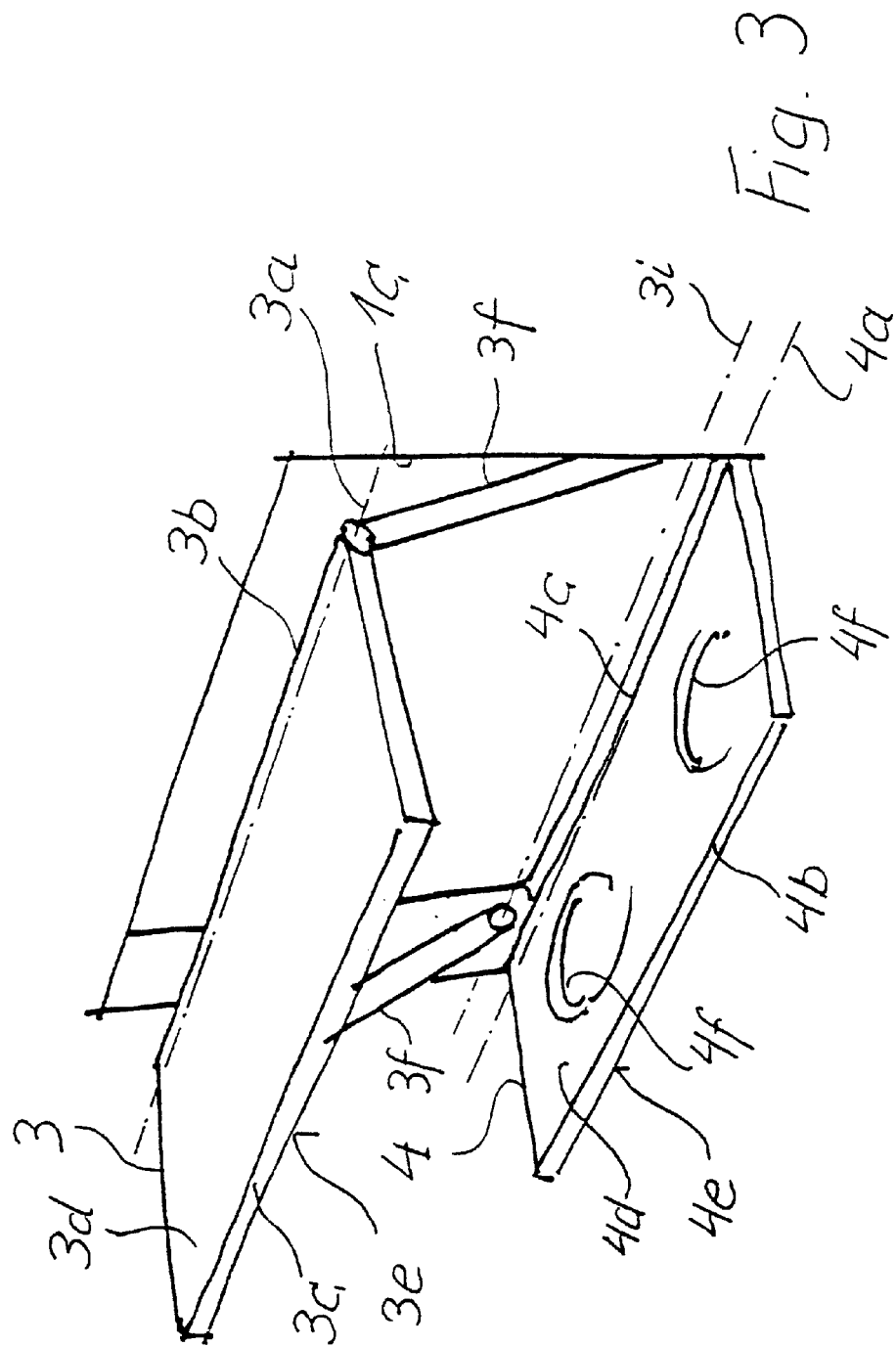
FIG. 3 shows a perspective view of the trays, according to FIG. 2, folded in the open position.

As shown in FIG. 3, tray 3 can be pulled forward out of recess 1c. In the process, securing rods 3f, which are arranged laterally on the tray 3, pivot out of recess 1c. These rods are seated within the latter recess so as to be capable of pivoting around a further transverse axis, 3i. The tray 3 possesses a flat top 3d. A longitudinal edge 3b of tray 3 lies at such a distance relative to the back of backrest 1 that access to objects placed upon the lower tray 4 is possible from above. A longitudinal edge 4c of the lower tray 4, in the folded-out position, forms a direct connection with the back of backrest 1. Holding depressions 4f, on which the secure placement of containers that protrude upward to a considerable degree is possible, are provided on the top 4d of the lower tray 4. These containers can be higher than the distance of the two trays, 3 and 4, from one another.

Figure 4:
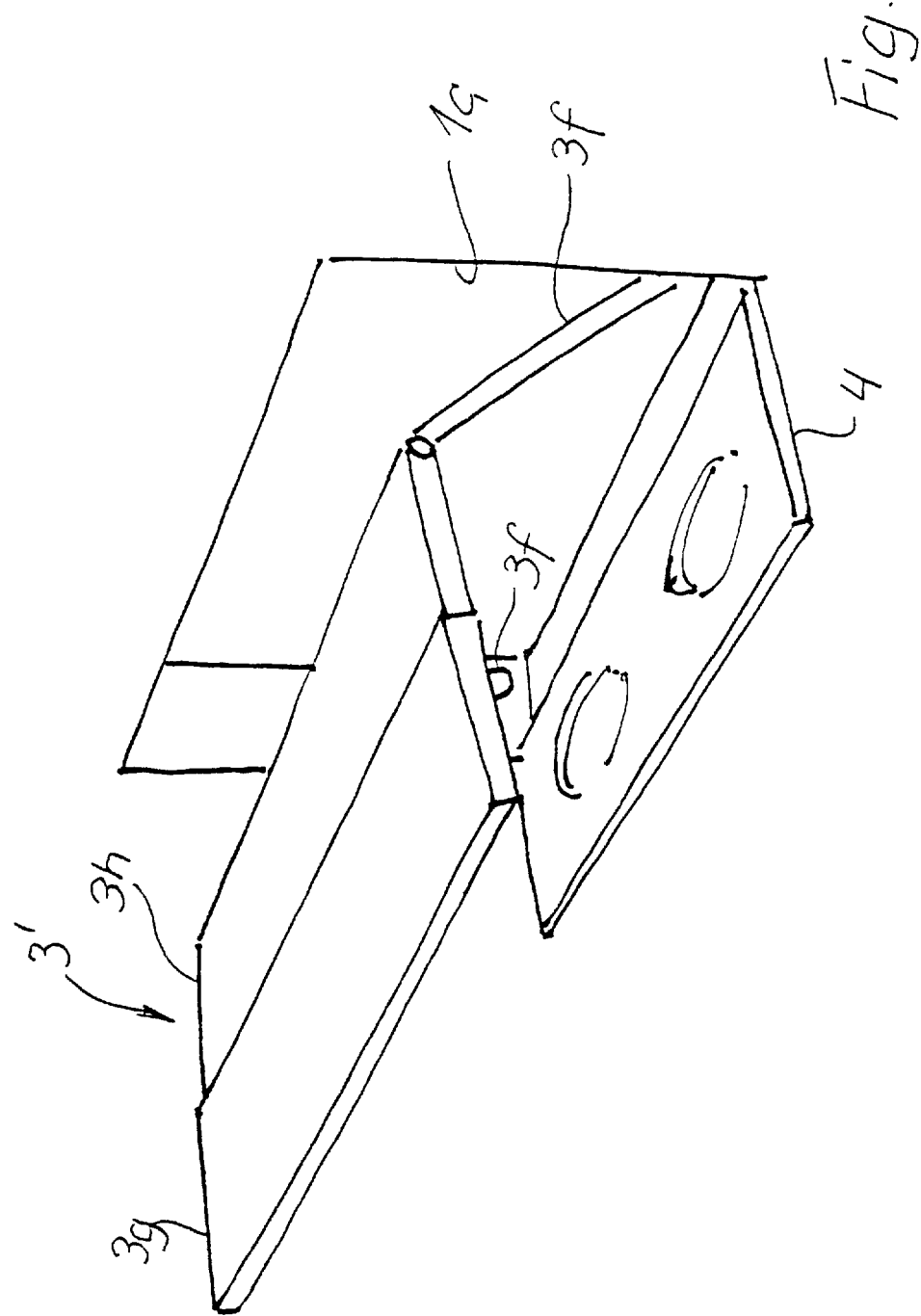
FIG. 4 shows a perspective, schematic view of the trays in a second embodiment form.
Figure 5:
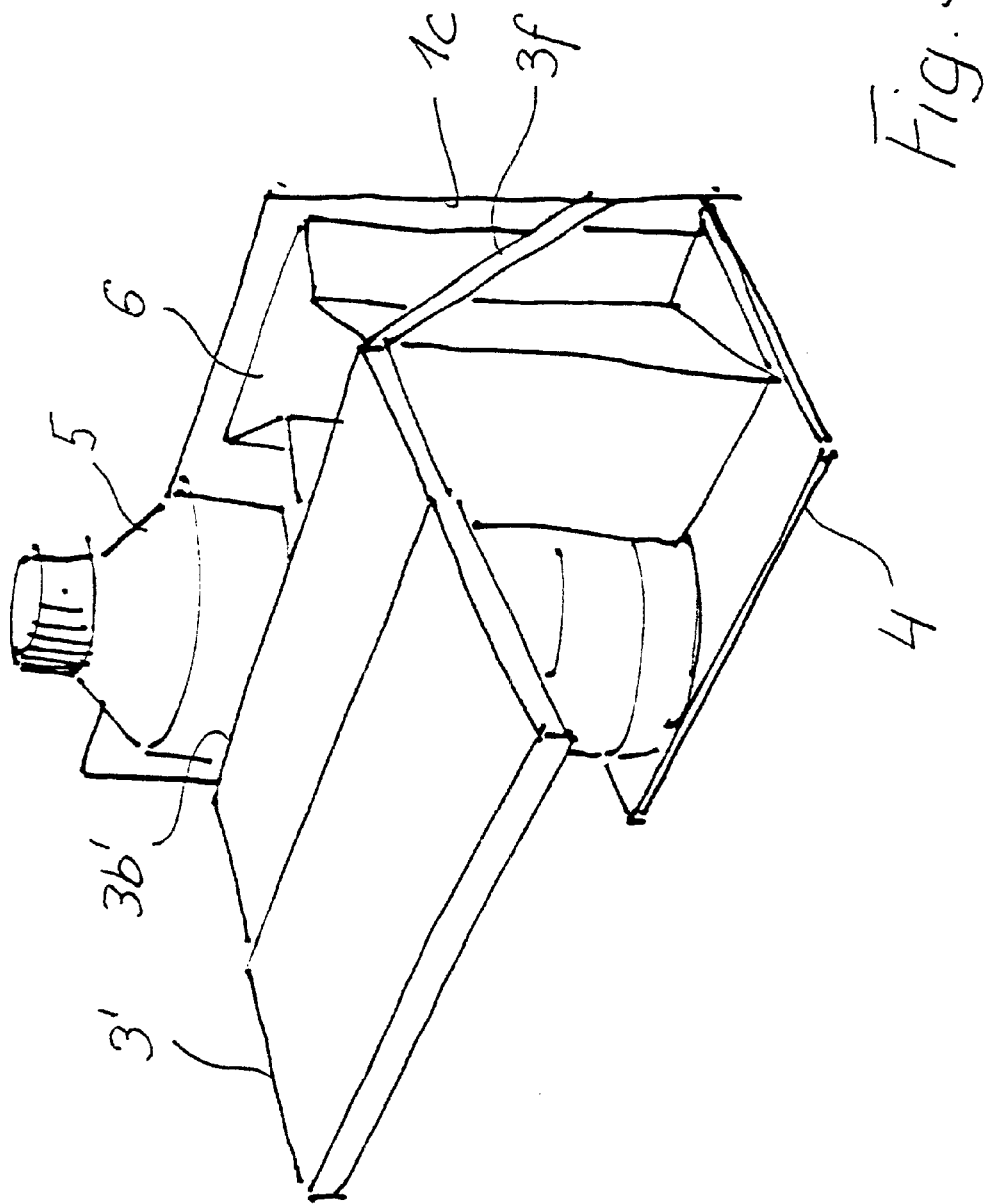
FIG. 5 shows a perspective view of the trays, according to FIG. 4, with an occupied lower tray.

The second embodiment form of the invention, which is depicted in FIGS. 4 and 5, is distinguished from the one that was described above only by virtue of the design of the upper tray 3'. The upper tray 3' is embodied such that it is divided. One half 3g of tray 3' is attached, in articulated fashion, to a second half 3h that is connected with securing rods 3f. The half 3g can be pivoted onto the second half 3h before the folding tray 3' is closed. It is also possible to embody the two halves 3g and 3h in such a way that they may be pulled out in telescope fashion. On the lower tray 4, for example, a bag 6 and a bottle 5 are stowed, which protrude into the space between one longitudinal edge 3b' of tray 3' and the back of the backrest 1.

Figure 6:
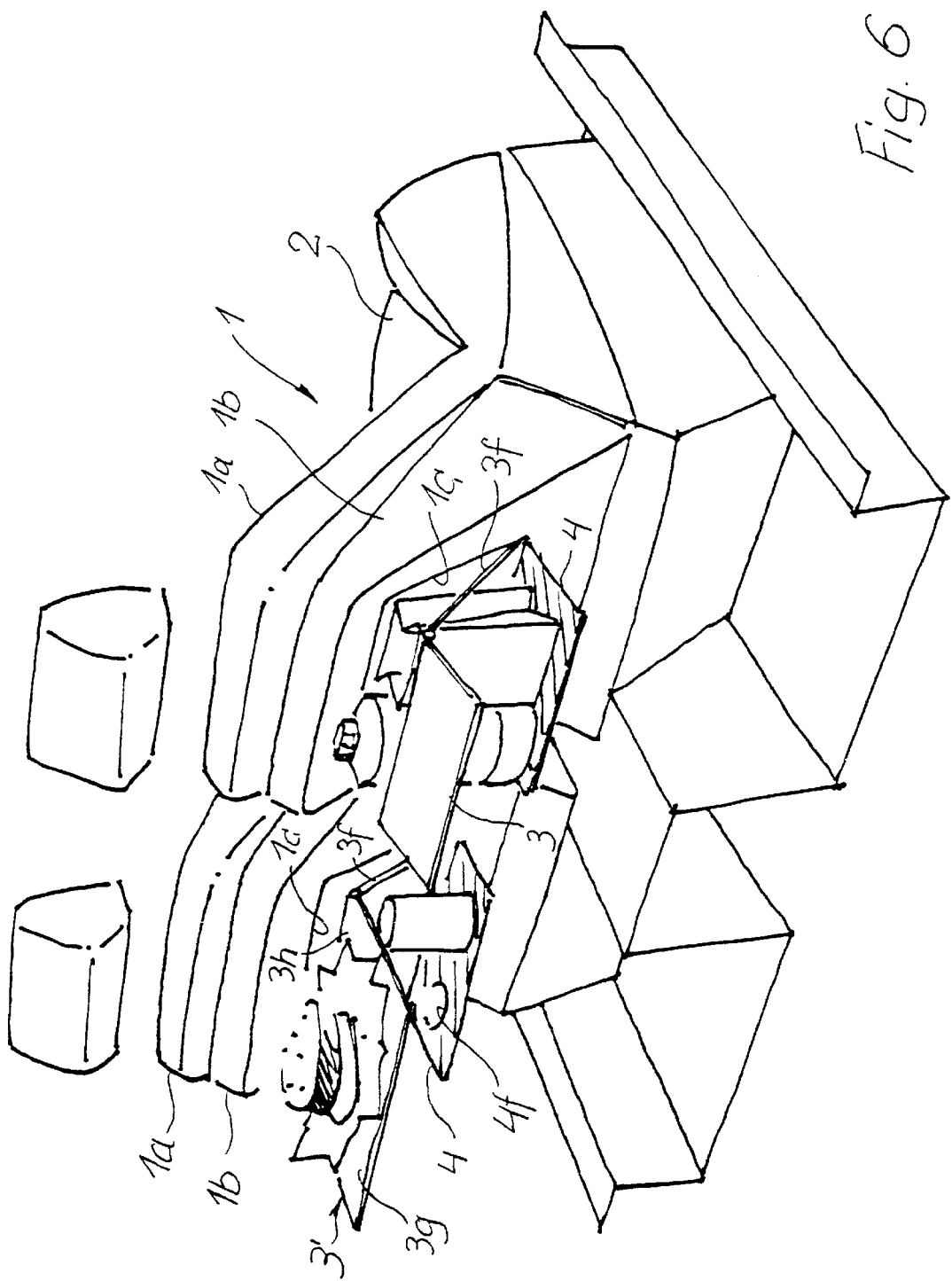
FIG. 6 shows the perspective view of the motor vehicle's front seats, according to FIG. 1, with the trays folded out in the two different embodiment forms.

In FIG. 6 once again, the overall view of all motor vehicle seats in a row with the trays folded out is depicted, a view that corresponds to FIG. 1. In this case, the backrest of one seat exhibits an undivided upper tray 3, while the other seat's upper tray 3' is enlarged by folding open both its halves, 3g and 3h. The trays 3' and 4 are covered with objects in exemplary fashion.

Obviously, the most widely varied embodiment forms of trays, arranged in two-storied fashion, are to be regarded as belonging to the invention. Thus, the trays can be arranged on the back of the backrest 1 in lamella-like fashion, or, in the folded up state, they may overlap each other as well. In addition to the direct articulation of both trays at the back of the backrest, it is also possible to embody the lower tray on securing rods such that it may be pulled out in which case the holding depressions should then be provided on the upper tray.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. Motor vehicle seat with a backrest, the backrest comprising: a lower tray pivotally connected to the backrest along a lower horizontal transverse axis attached to the backrest; and an upper tray articulated at the backrest by lateral securing rods with one end attached to the backrest and an opposite end attached to a rear upper longitudinal edge of the upper tray, wherein the lateral securing rods allow the upper tray to extend in a horizontal position a distance from the backrest such that an opposite, forward longitudinal edge of the upper tray extends past a forward longitudinal edge of the lower tray.

2. Motor vehicle seat according to claim 1, wherein the lower tray and the upper tray lie flush in a closed position in a commonly shared recess in the backrest.

3. Motor vehicle seat according to claim 2, wherein the upper tray or the lower tray has a horizontal edge arranged behind the other as the upper and lower trays lie flush in the commonly shared recess.

4. Motor vehicle seat according to claim 1, wherein a top usable surface of the lower tray and a top usable surface of the upper tray are arranged one above the other, and that the upper tray pivots about an upper transverse axis adjacent to an upper longitudinal edge of the upper tray, and the lower tray pivots about the lower transverse axis adjacent to a lower longitudinal edge of the lower tray.

5. Motor vehicle seat according to claim 4, wherein the upper tray or the lower tray has holding depressions for containers.

6. Motor vehicle seat according to claim 5, wherein the holding depressions are provided in the lower tray, and the space extending above the holding depressions is not obstructed by the upper tray.

7. Motor vehicle seat according to claim 1, wherein the upper tray includes two halves that are connected to one another, which in the horizontal position of the upper tray, one half moves longitudinally in a commonly shared plane with the other half in telescopic fashion.

8. Motor vehicle seat according to claim 1, wherein the upper tray includes two halves with one half attached to an opposite half in such a manner that the one half can be folded over the opposite half.

9. Motor vehicle seat according to claim 1, wherein the upper and lower trays are held at the backrest in a closed position by contact a lower horizontal edge of the upper tray and an upper horizontal edge of the lower tray.

10. Motor vehicle seat according to claim 1, wherein the lower horizontal transverse axis is parallel to the upper horizontal transverse axis.

* * * * *